June 5, 1956  R. H. RICHMOND, SR  2,748,534
SPRAY APPARATUS FOR TOBACCO PLANTS
Filed Sept. 11, 1953
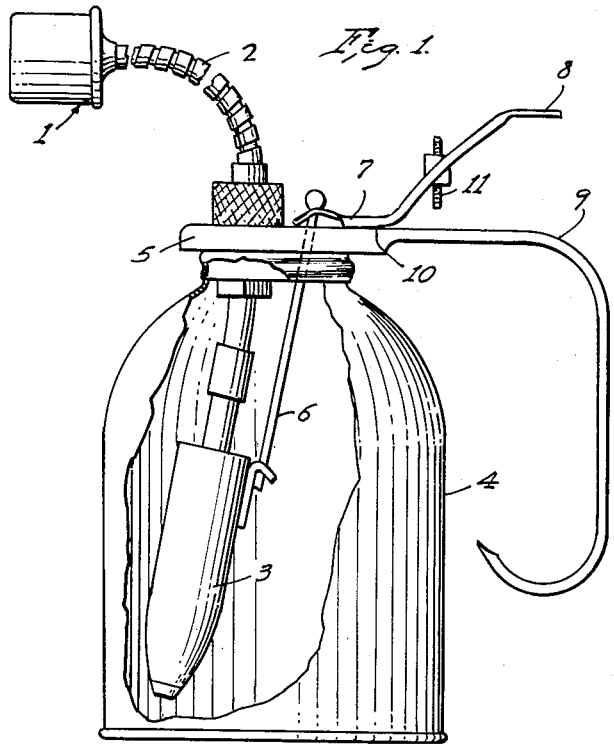
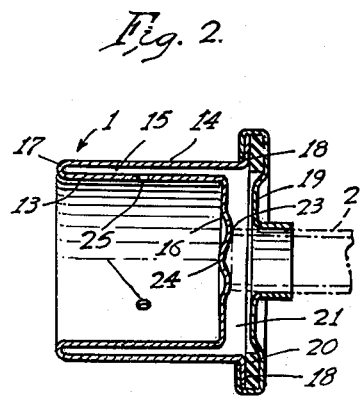
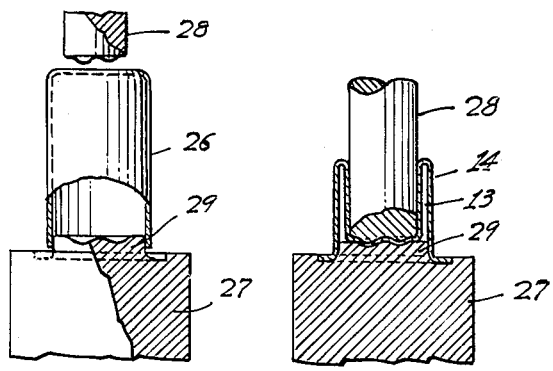
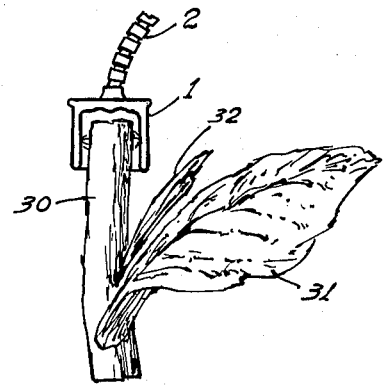
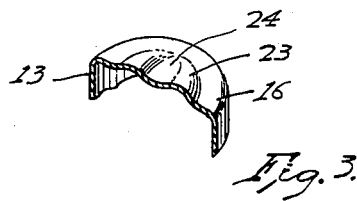
INVENTOR.
Roy H. Richmond Sr.
BY
Christy Parmelee & Strickland
ATTORNEYS:-

United States Patent Office 2,748,534
Patented June 5, 1956

2,748,534

SPRAY APPARATUS FOR TOBACCO PLANTS

Roy H. Richmond, Sr., Wellsburg, W. Va., assignor to Eagle Manufacturing Company, Wellsburg, W. Va., a corporation of West Virginia Application September 11, 1953, Serial No. 379,530

5 Claims. (Cl. 47—1)

This invention is directed to an improved apparatus for applying light mineral oil to tobacco plants for the purpose of killing the sucker leaves and rendering their physical removal unnecessary.

Tobacco plant sucker leaves usually appear on the stalk of the plant adjacent the usable leaf and unless removed will reduce the production of usable leaf by the plant. Removal of the sucker leaves may be accomplished either manually, a tedious and time consuming operation, or by applying a coating of light mineral oil to the stalk of the plant in a manner which causes the sucker leaves to shrivel and die. The apparatus of this invention is concerned with the latter method of treating tobacco plants.

More particularly, the apparatus of this invention comprises a nozzle which is specifically adapted for applying to the tobacco plant stalk a treating fluid, such as a light mineral oil, a flexible tube connected with the nozzle for delivering the treating fluid thereto, and a manual pump connected with the tube which is effective on each manual operation thereof to deliver through the tube to the nozzle a predetermined quantity of treating fluid. The manual pump is preferably a conventional apparatus of the type commonly referred to as a hand oiler which includes a container for the fluid and a trigger operated pump effective upon each operation to pump a predetermined quantity of fluid. In a manner to be described, the nozzle is constructed to provide an enclosure or housing for the upper end of the plant stalk being treated and is effective to spray the treating fluid on the stalk end while it is enclosed therein.

Accordingly, this invention has as one of its principal objects the provision of an apparatus forming an enclosure for the upper end of the stalk end and which will subject the entire peripheral surface of the stalk end while contained in the enclosure to the action of treating fluid supplied in a controlled and regulated quantity.

A further object of the invention is to provide an improved nozzle of cup-shaped configuration in which the stalk end of the plant to be treated is received and which has nozzle orifices in the sidewall thereof through which the treating fluid is projected onto the surface of the stalk and an annular chamber about the sidewall for supplying treating fluid to the orifices.

Another object is to provide an improved nozzle of the character referred to which is fabricated from a thin gauge metal tube having an end portion turned inwardly with respect to its other end portion to provide spaced concentric cylinders defining the annular chamber and with the inner cylinder forming the stalk receiving enclosure.

Other objects and advantages of the invention will become apparent from the following description.

In the drawings there is shown a preferred embodiment of the invention. In this showing:

Fig. 1 is an elevational view of a spray apparatus constructed in accordance with the principles of this invention, a portion of the container being broken away to show the pumping unit mounted therein;

Fig. 2 is a sectional view of the spray nozzle shown in Fig. 1;

Fig. 3 is a fragmentary perspective view of a portion of the nozzle shown in Fig. 2;

Fig. 4 is a fragmentary perspective view illustrating the manner in which the stalk of the plant to be treated is received within the nozzle;

Fig. 5 is a fragmentary elevational and sectional view illustrating diagrammatically an apparatus for forming the nozzle of this invention from a tubular blank; and Fig. 6 is a view similar to Fig. 5 illustrating the apparatus after completion of its nozzle forming operation.

In the drawings, the nozzle of this invention is designated as a whole by the numeral 1. As shown in Fig. 1 it is connected by a flexible tube 2 to a conventional structure commonly called a hand oiler and which includes a pump unit 3 mounted in a receptacle 4. The receptacle 4 has a removable cap closure 5 mounting the pump unit 3, and an actuating rod 6 extends through an opening in the cap 5 for actuation by a rock lever or a trigger 7. When the outer end 8 of the trigger 7 is depressed relative to the handle 9, the trigger 7 rocks about the point 10 on the handle 9 to elevate the rod 6 and pump unit 3 connected to its lower end. An adjusting screw 11 is secured to the trigger 7 for limiting the extent to which the end 8 may be depressed and thereby the elevating movement of the pump unit 3 and the quantity of fluid forced through the tube 2 to the nozzle 1. Depending upon the adjustment of the screw 11, each depression of the trigger end 8 will force a predetermined quantity of fluid through the tube 2. The parts 3 through 11 are conventional and form no part per se of this invention.

As best shown in Fig. 2, the nozzle 1 comprises an inner cylinder 13 and an outer cylinder 14 which are concentric and spaced from each to define therebetween an annular reservoir chamber 15. The inner cylinder 13 has an end closure 16 at one end thereof and its other end has an outwardly projecting lip or flange 17 which is integrally connected with one end of the outer cylinder 15. The other end of the cylinder 15 projects beyond the cap closure 16 and has an outwardly projecting flange or lip 18 about which the peripheral edge of a cap closure 19 is crimped with a washer 20 clamped between the cap 19 and the flange 18 to provide a fluid seal. The cap 19 has a central opening through which the tube 2 extends into the space 21 between the cap 19 and the closure 16, the tube 2 having a soldered connection in the opening through which it extends. As best shown in Fig. 3, the end closure 16 has a centrally located projection 23 of circular shape and a groove 24 extends diametrically of this projection. In assembly, the end of the tube 2 is placed in abutting engagement with the projection 23 so that fluid delivered through the tube 2 can move into the space 21 and annular reservoir chamber 15 only through the ends of the groove 24 thereby assuring equal distribution of the treating fluid to opposite halves of the nozzle.

The inner cylinder 13 is provided with plural orifice openings 25, preferably three in number although a greater number may be provided if desired, through which fluid may be projected from the chamber 15. The orifice nozzles 25 have a very small diameter and are in the nature of pin holes so that fluid in the supply chamber 15 will not flow therethrough unless placed under pressure. When the reservoir chamber 15 is filled with fluid which is supplied thereto by the pump 3 through the tube 2, additional quantities of fluid supplied by the pump 3 will increase the pressure of the fluid in the chamber 15 and cause a predetermined quantity to be projected through the openings 25 in accordance with the quantity supplied by each actuation of the pump 3. The orifice openings 25 are respectively located centrally of the ends of the cylinder 13 and are spaced at equal angular intervals about the circumference of the cylinder 13 so that a stalk positioned within the cylinder 13 will have all of its entire peripheral surface subjected to the action of the treating fluid.

The nozzle 1 is preferably fabricated from a single tubular blank of sheet metal by an apparatus such as shown in Figs. 5 and 6. In this showing, the blank is designated by the numeral 26 and is positioned between a platen 27 and a punch 28. The platen 27 has a circular projection 29 over which the open end of the blank 26 has a snug fit. The projection 29 has a diameter greater than the diameter of the punch 28 which controls the diameter of the inner cylinder 13. When the punch 28 is moved inwardly to the position shown in Fig. 6, the end of the blank 26 is moved inwardly, and its outer end portion is turned inwardly on itself to form the cylindrical portions 13 and 14. The ends of the punch 28 and projection 29 have cooperating surfaces which are shaped to form the projection 23 and groove 24 as shown in Fig. 3.

The inner cylinder 13 and its end closure 16 define a cup-shaped cylindrical recess in the nozzle 1 in which the stalk end of a tobacco plant is received. The manner in which the stalk end is received in this recess is illustrated in Fig. 4 in which the numeral 30 designates the stalk end of a tobacco plant 31 as a tobacco leaf, and 32 is a sucker leaf. The stalk end 30 is prepared by topping the plant in accordance with conventional practice. The sucker leaf 32 usually grows out of the space between the leaf 31 and the stalk in the manner indicated in the drawing. To treat the plant, the nozzle 1 is moved downwardly to a position approximately as shown in Fig. 4 in which the stalk end 30 is positioned within the cup-shaped recess in the nozzle 1. With the stalk end positioned in the cup-shaped recess within the nozzle 1, the end 8 of the trigger 7 is depressed manually to deliver a predetermined amount of fluid to the nozzle 1. The quantity of fluid ejected from the nozzle 1 is dependent upon the adjustment of the set screw 11 which is regulated to insure a supply of fluid adequate to treat the stalk of a single plant. This fluid is projected in fine streams from the several orifices 25 against the peripheral surface of the end 30. The streams of fluid from the several orifices 25 are projected in a radial direction against the surface of the stalk end 30 and at equally spaced angular intervals thereabout so that the entire peripheral surface of the stalk is covered. This fluid runs down the stalk and contacts the sucker leaves 32 at their point of connection with the stalk and, as indicated above, is effective to kill the leaves. Attention is particularly directed to the manner in which the nozzle 1 forms a housing enclosure or spray chamber for the stalk end 30 and this feature together with the manner in which the nozzle projects several streams from different angular directions against the stalk is effective to insure application of fluid to its entire peripheral surface so that the fluid in draining down over the stalk will contact the bases of the sucker leaves regardless of their angular position with respect to the stalk.

While I have illustrated and described a preferred embodiment of my invention, it will be understood that this is merely by way of illustration, and that various changes and modifications may be made therein within the contemplation of the invention and under the scope of the following claims.

I claim:

1. For use in spraying treating fluid on tobacco plant stalks, the combination comprising a nozzle having an inner portion of cylindrical cup-shape closed at one end thereof and open at its other end to provide a housing in which the plant stalk to be sprayed is received, an outer portion of cylindrical shape concentric with said inner portion and cooperating therewith to provide an annular fluid reservoir chamber about said inner portion, said inner portion having a plurality of orifice openings respectively at points intermediate its ends through which fluid may be projected under pressure from said annular reservoir chamber against the surface of a plant stalk received in said housing, a tube having a liquid sealing connection with said outer portion for delivering fluid to said reservoir chamber and means connected with said tube and intermittently actuatable and effective on each actuation thereof to deliver a predetermined quantity of fluid under pressure through said tube to said annular reservoir chamber so as to displace a like amount of fluid from the reservoir.

2. In a spraying device for handling measured quantities of fluid to stalks of a tobacco plant, a nozzle comprising an inner cylinder open at one end and having a closure at its other end, an outer cylinder concentric with and spaced from said inner cylinder and cooperating therewith to provide an annular fluid reservoir chamber about said inner cylinder, said outer cylinder having one end integrally connected with said inner cylinder at its open end and its other end extending beyond said closure, a cap closure having a fluid sealing connection with said other end of said outer cylinder and having a central opening therein, and a supply tube connected through said central opening for delivering measured quantities of fluid to said reservoir chamber, said inner cylinder having orifice openings respectively at points centrally of its ends through which fluid may be projected under pressure from said annular reservoir chamber in a radial direction into the interior of said inner cylinder.

3. A nozzle as claimed in claim 2 characterized by said inner and outer cylinders being fabricated from a single tubular blank having a closed end inverted inwardly relative to its other end.

4. A nozzle as claimed in claim 2 characterized by the closure for said inner cylinder having a projecting portion of circular shape arranged centrally thereof and a groove extending diametrically of said projecting portion, said tube having abutting engagement with said projecting portion whereby fluid delivered through said tube is admitted to said chamber through the ends of said groove.

5. In a spraying device for delivering measured quantities of fluid to stalks of a tobacco plant, a nozzle comprising spaced inner and outer cylindrical walls connected at one end of the nozzle to provide an opening for reception of a tobacco stalk, a closure wall at the opposite end of the inner cylindrical wall, a closure wall for the outer cylinder disposed in substantially parallel spaced relation to the inner cylinder closure wall, the spaced walls of the inner and outer cylinders forming a reservoir for spray liquid, an opening in the outer cylinder top wall for reception of liquid from the spray device and apertures in the inner cylinder side wall above the bottom of said reservoir for spraying liquid on the inserted tobacco stalk when spray liquid under pressure is received into the reservoir through the nozzle top wall opening from the spray device.

References Cited in the file of this patent

UNITED STATES PATENTS

| | | |
|---|---|---|
| 223,332 | Fox | Jan. 6, 1880 |
| 1,262,865 | Stocking | Apr. 16, 1918 |
| 1,682,544 | Young | Aug. 28, 1928 |
| 1,883,656 | Estock | Oct. 18, 1932 |
| 1,937,344 | Hollingsworth | Nov. 28, 1933 |
| 2,328,627 | Eddins | Sept. 7, 1943 |
| 2,605,144 | Northup | July 29, 1952 |

OTHER REFERENCES

"The Clip-Oil," pub. Oct. 1950 by N. C. Agr. Expt. Sta., Dept. Agr. Engineering, Information Series No. 3, page 7.